(12) United States Patent
Lai

(10) Patent No.: US 6,924,458 B2
(45) Date of Patent: Aug. 2, 2005

(54) AUXILIARY FOCUSING TOOL FOR LASER MARKER

(75) Inventor: Jin-Sheng Lai, Hsi Chih (TW)

(73) Assignee: Great Computer Corp., Taipei Hsien (TW)

( * ) Notice: Subject to any disclaimer, the term of this patent is extended or adjusted under 35 U.S.C. 154(b) by 90 days.

(21) Appl. No.: 10/620,424

(22) Filed: Jul. 17, 2003

(65) Prior Publication Data

US 2005/0011871 A1 Jan. 20, 2005

(51) Int. Cl.[7] .......................... B23K 26/02; B23K 26/08
(52) U.S. Cl. ........................... 219/121.78; 219/121.83
(58) Field of Search ........................ 219/121.78, 121.83, 219/121.85, 121.6, 121.82

(56) References Cited

U.S. PATENT DOCUMENTS 5,837,962 A * 11/1998 Overbeck .............. 219/121.68
2002/0057481 A1 * 5/2002 Souda et al. ................ 359/205
2004/0104202 A1 * 6/2004 Downes et al. .......... 219/121.8
2004/0159641 A1 * 8/2004 Kaplan et al. ......... 219/121.68

* cited by examiner

*Primary Examiner*—M. Alexandra Elve
(74) *Attorney, Agent, or Firm*—Dennison, Schultz, Dougherty & MacDonald

(57) ABSTRACT

An auxiliary focusing tool for a laser marker for adjusting a distance between a laser focal lens and a work piece before laser marking, the tool comprises: a holding member provided on the laser marker, and a collapsible measuring kit provided on the laser marker at an outputting position of a light source, the measuring kit and the holding member get a predetermined length and are perpendicular to a working surface on the work piece after they are stretched out; and the measuring kit is collapsible to be received in the holding member when it is stored.

5 Claims, 4 Drawing Sheets

AUXILIARY FOCUSING TOOL FOR LASER MARKER

BACKGROUND OF THE INVENTION

1. Field of the Invention

The present invention is related to an auxiliary focusing tool for a laser marker, and especially to such a simple auxiliary focusing tool able to accurately and fast adjust the focal distance between a laser focal lens and a work piece, it suits engraving equipments such as laser markers.

2. Description of the Prior Art

Marks for conventional industrial products are tags made by corrosion, photoelectric processing, mechanical carving and die punching etc., they have inferior accuracy, and are subject to deformation, efficiencies of the articles obtained from which are low and speed of processing is slow, the dies for them are subject to damage and need frequent changing; if the products are numerous in their amount, serial numbers or specifications, the dies for the tags need changing to more increase cost.

In the initial stage of the years of eighties, a brand new technique of application in lasing (laser mark-marking technique) was developed quietly in the world; the technique is an accomplishment resulted from modern high scientific techniques including the laser technique and the computer technique; when articles of plastic, rubber or mechanical parts, or of electronic devices, instruments, tools etc. are to have their surfaces given markings composed of letters, patterns etc., in contrary to conventional mechanical engraving, chemical corrosion, silk-net printing, ink printing etc., the laser mark-marking technique has the features of wide scope of application, high accuracy and efficiency of marking, capability of being controlled with a computer, non-limitation of life of use by fatigue induced by marking as is the case of a conventional die, and firmness as well as permanence of the markings made on the work pieces by laser action.

Generally, when laser beams are irradiated on a work piece 3 for marking, the focal point of the output light source shall be adjusted to get the best effect of processing, the laser markers available presently are mutually different in their scope of processing in pursuance of their mutually different specifications of lenses for focusing. The focal lengths of the different specifications of lenses for focusing are also mutually different; thereby, before laser marking, a measuring tool such as a meter 1 must be used to measure the distance between a laser marker 2 and the work piece 3. As shown in FIG. 1, for example, with a given output lens, the work piece 3 must have a distance 10 cm from the laser marker 2 as the focal length; in processing, a tool such as the meter 1 or a block gauge must be used to get the distance 10 cm by measuring between the laser marker 2 and the work piece 3 and then the work piece 3 is gradually adjusted and positioned before starting the process of laser marking. However, there is no effective measuring tool on conventional laser markers, operators generally measure focal distances with meters 1 on their hands; when the shapes of the surfaces of work pieces 3 are irregular or thickness of the work pieces 3 is different, this measuring mode is hard to be used normally and is subject to making errors to make outputs 4 of the laser light sources onto the work pieces 3 too deep or too shallow to thereby make flaws on the products.

In view of these, the inventor of the present invention developed the present invention based on his experiences of years after hard study to get rid of the conventional defects.

SUMMARY OF THE INVENTION

The primary object of the present invention is to provide an auxiliary focusing tool for a laser marker able to accurately and fast adjust the focal distance between a laser focal lens and a work piece.

To get the above object, the auxiliary focusing tool for a laser marker of the present invention can provide adjustment and fixing of the focal distance between a laser focal lens and a work piece before laser engraving; it comprises: a holding member provided on the laser marker, a collapsible measuring kit provided on the laser marker at the outputting position of a light source. The measuring kit and the holding member get a predetermined length and are perpendicular to the working surface after they are stretched out; and the measuring kit can be collapsed for receiving in the holding member when it is stored.

Thereby, before laser marking, adjustment and fixing of the focal distance between a laser focal lens and a work piece can be made.

The present invention will be apparent after reading the detailed description of the preferred embodiment thereof in reference to the accompanying drawings.

DETAILED DESCRIPTION OF THE PREFERRED EMBODIMENT

Figure 1:
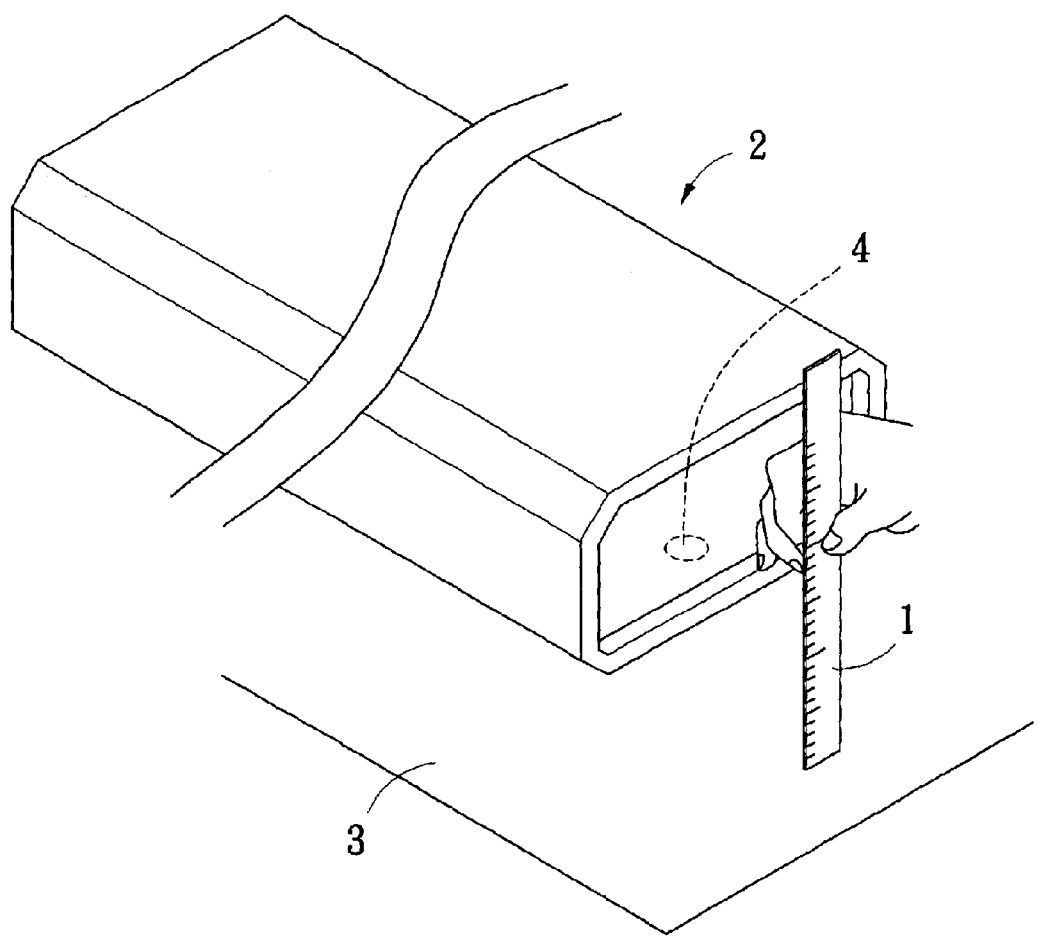
FIG. 1 is a schematic perspective view showing use of a conventional measuring mode using a meter to measure a focal distance.
Figure 2:
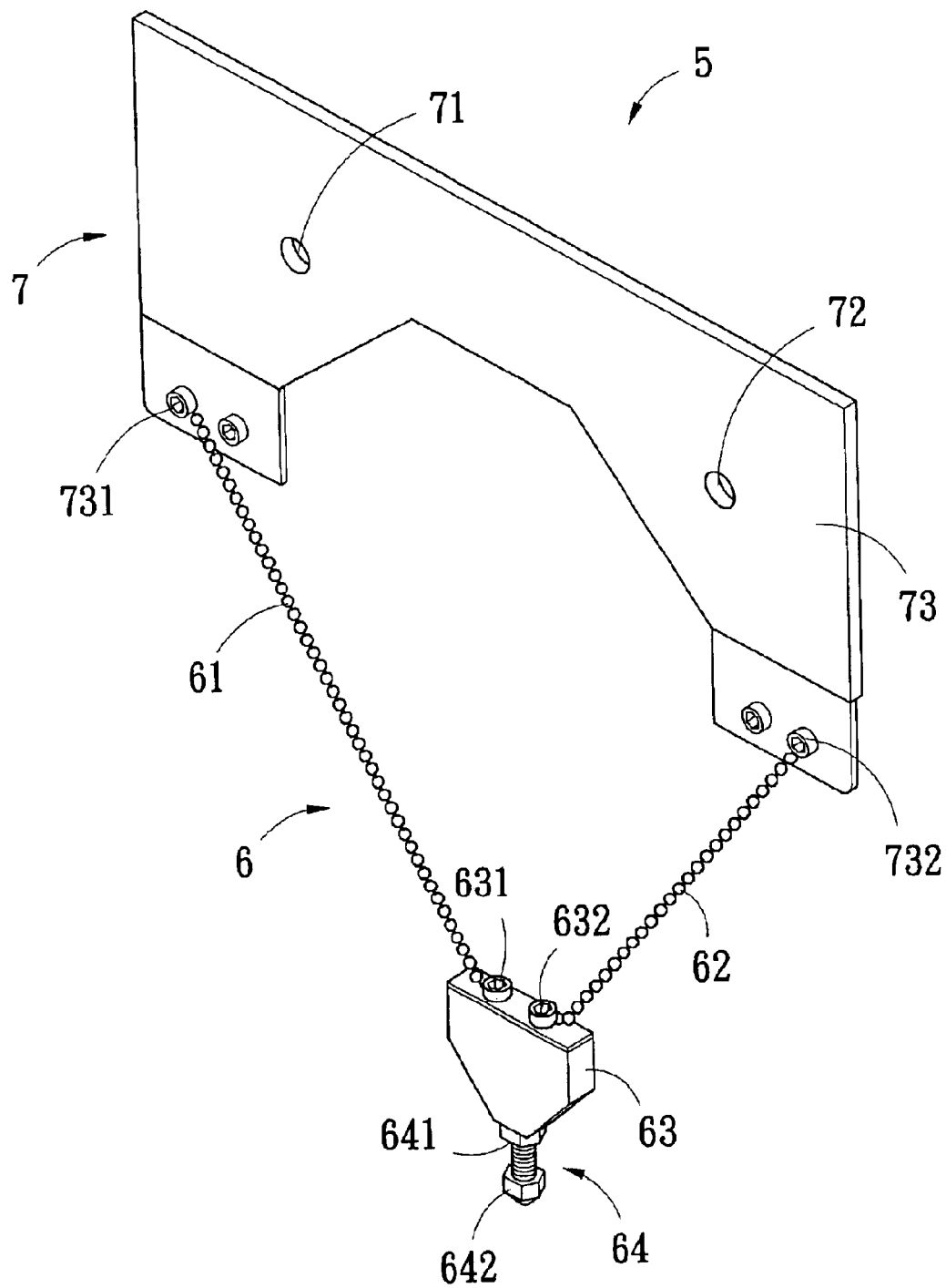
FIG. 2 is a perspective view showing the appearance of an embodiment of the auxiliary focusing tool for a laser marker of the present invention.

Referring to FIG. 2 showing the embodiment of an auxiliary focusing tool 5 for a laser marker 2 of the present invention, the tool 5 comprises:

a holding member 7 provided on the laser marker 2;

a collapsible measuring kit 6 provided on the laser marker 2 at the outputting position of a light source, the measuring kit 6 and the holding member 7 get a predetermined length to get a fixed distance from the measuring kit 6 to the laser marker 2 and are perpendicular to a working surface after they are stretched out; and the measuring kit 6 can be collapsed for receiving in the holding member 7 when it is stored.

Figure 5:
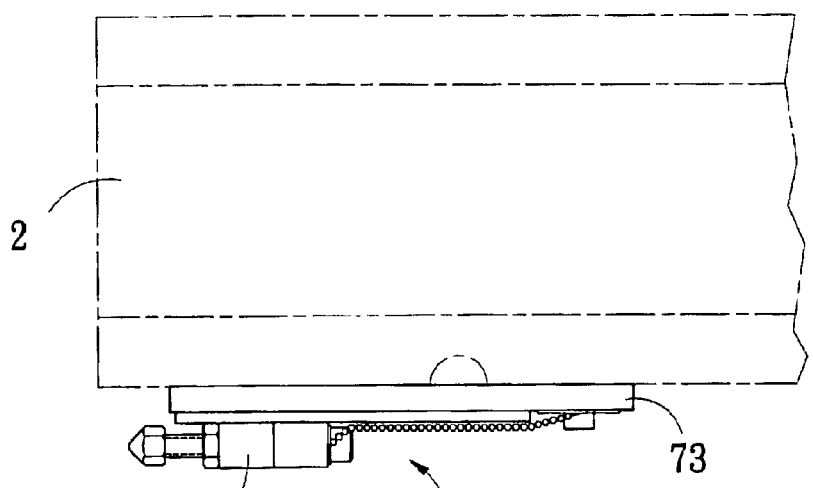
FIG. 5 is a schematic view showing the pendent is collapsed and attached to a sheet member of the present invention.

When in practicing, the measuring kit 6 can be composed of a pendent 63 with chains 61, 62, the pendent 63 is in a specific geometric shape such as is shown in FIG. 5, such a design makes the pendent 63 uneasy to wave laterally and fast to get in its stable position when it is drooped, and also avoids the pendent 63 from rotating to induce tangling of the chains 61, 62 to make a deviation problem of focusing. The pendent 63 is made of metallic material, the upper end of it has two lateral screw fixing members 631, 632 attached thereto respectively by the chains 61, 62. The chains 61, 62 are specifically designed, such as in the form of a bead chain each to make them uneasy to tangle. And the pendent 63 is provided on the tailing end thereof with a fine-tuning means 64 composed of a screw hole 641 and a bolt 642 screw locking in the screw hole 641, so that positioning of the measuring kit 6 can be made in a fine-tuning way to make it more accurate.

Figure 3:
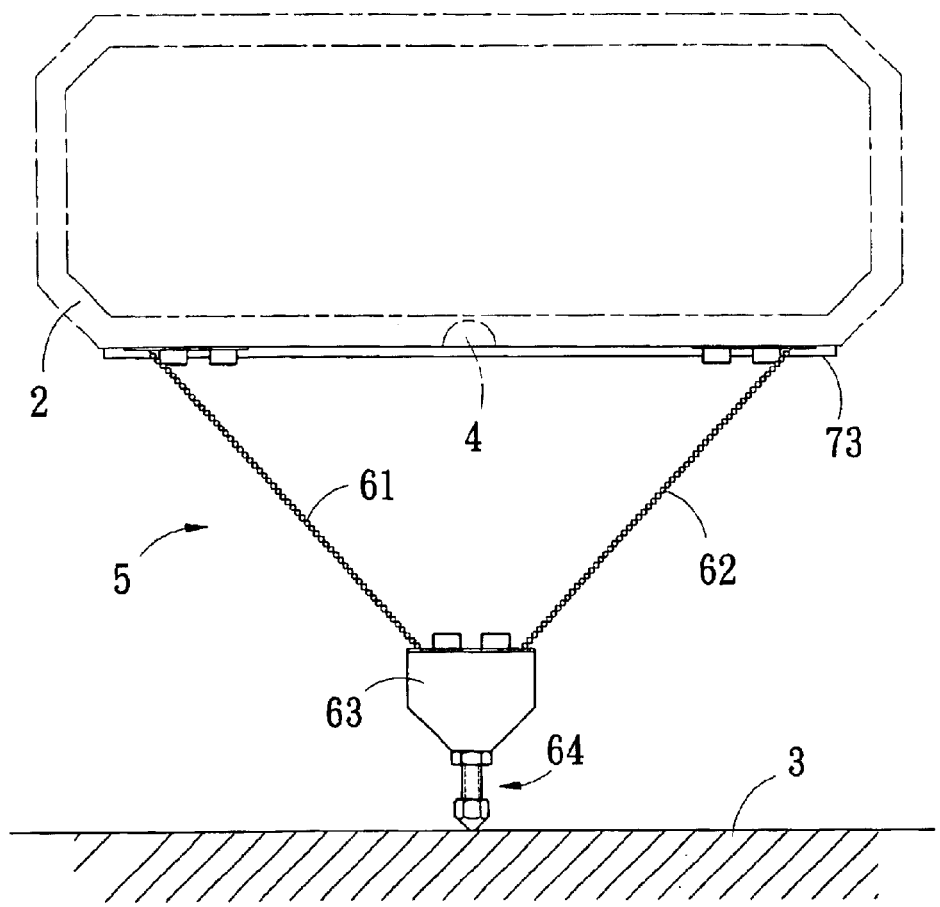
FIG. 3 is a schematic view showing use of the embodiment of the present invention on a laser marker.

The other ends of the chains 61, 62 can be locked on a sheet member 73 in the first place, and then are locked on the bottom of the laser marker 2. The sheet member 73 is in the shape of an inversed "U", it has thereon two holes 71, 72 for locking on the laser marker 2; and has on two lateral bottom sides thereof two screw connecting members 731, 732 to connect the other ends respectively of the chains 61, 62. Therefore, when the sheet member 73 is connected to the laser marker 2, the pendent 63 and the chains 61, 62 are hung under the sheet member 73 in the shape of "Y" (as shown in FIG. 3). And the sheet member 73 can partially be made of magnetic material to form the abovementioned holding member 7; hence the pendent 63 can directly be attracted to attach to the sheet member 73.

Thereby, with such an effective structural designing, in producing the laser marker machine 2, a best processing distance can be measured in antecedent in pursuance of the size of a lens attached to the laser-marking machine 2, the distance can be one of three kinds, for example, 10 cm, 20 cm and 30 cm, then measuring kits 6 can be modularized and divided into three kinds, so that operators can select lenses to mount on by themselves in using. By providing the fine-tuning means 64 and the screw hole 641 and bolt 642 on the tailing end of the pendent 63 for a measuring kit 6, the bolt 642 can be suitably and flexibly adjusted to get a more accurate focal distance.

Figure 4:
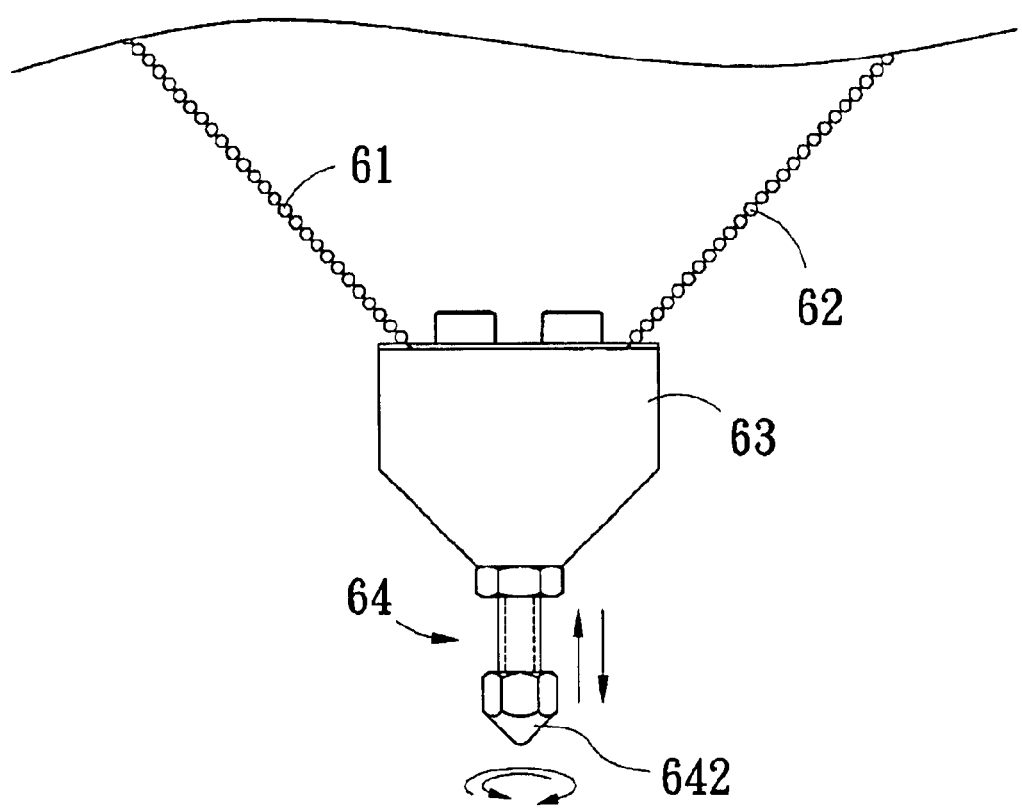
FIG. 4 is a schematic view showing use of a fine-tuning means on the tailing end of a pendent of the present invention.

When in practicing, as shown in FIGS. 3-5, when the auxiliary focusing tool 5 meets the focal length for laser marking this time, the sheet member 73 is locked on the laser marker 2, the pendent 63 and the chains 61, 62 are drooped down by the attraction of the earth to be hung under the sheet member 73 in the shape of "Y". Now the vertical distance of the tailing end of the pendent 63 hung under the sheet member 73 is exactly the focal distance between the laser marker 2 and a work piece 3; thereby, no manual measuring tool is held for operation, it needs only to adjust the work piece 3 to be flush with the tailing end of the pendent 63 for correct focusing, then the pendent 63 is attracted to attach to the sheet member 73, and then the operation of laser marking can be directly performed; even when the work piece 3 is changed for one with the surface thereof irregular in shape or thickness, once the above stated actions are repeated to get correct focusing, the process of laser marking can be directly performed without measuring for focusing.

The present invention thereby has the following advantages:

1. The auxiliary focusing tool for a laser marker of the present invention is structurally simple, different focal distances can be obtained in pursuance of the requirements for the auxiliary focusing tool, it is accurate and fast in focusing, convenient in collapsing for storing; no trouble of requiring a measuring meter is there to measure manually by careful checking the scales thereon, this can largely reduce the error of measuring and increase the accuracy of processing.

2. The pendent of the present invention is provided on the tailing end thereof with a fine-tuning means to allow suitable and flexible adjustment of the length of the pendent; and in laser marking, an operator can collimate and adjust at any time to get more accurate focal distance for engraving.

The preferred embodiment is only for illustrating and not for giving any limitation to the scope of the present invention. It will be apparent to those skilled in this art that various modifications or changes made to the present invention without departing from the spirit of this invention shall fall within the scope of the appended claims.

In conclusion, according to the description disclosed above, the present invention surely can get the expected object thereof to provide a structurally simple auxiliary focusing tool for a laser-marking machine able to accurately and fast adjust the focal distance between a laser focal lens and a work piece before laser marking. Having thus described my invention with practicable value.

What I claim as new and desire to be secured by Letters Patent of the United States are:

1. An auxiliary focusing tool for a laser marker for adjusting a distance between a laser focal lens and a work piece before laser marking, said tool comprises;

a holding member provided on said laser marker, and a collapsible measuring kit provided on said laser marker, at an outputting position of a light source, said measuring kit and said holding member have a predetermined length and are perpendicular to a working surface on said work piece after they are stretched out; and said measuring kit is collapsible to attach to said holding member when it is stored.

2. The auxiliary focusing tool for a laser marker as in claim 1, wherein said measuring kit is composed of a pendent with two chains connected each on one end thereof with a sheet member, said pendent is made of metallic material, said sheet member is made of magnetic material and said pendent is directly attracted to attach to said sheet member when it is stored.

3. The auxiliary focusing tool for a laser marker as in claim 2, wherein said pendent is in a pentagon shape, an upper end of said pendent is attached thereto at two lateral positions by an end of each of said chains, said sheet member is in the shape of an inversed "U", having two lateral bottom sides to connect other ends respectively of said chains.

4. The auxiliary focusing tool for a laser marker as in claim 3, wherein said two chains provided on said upper end of said pendent are connected each on one end thereof with one of two screw connecting members provided on two lateral bottom sides of said sheet member, and on the other end thereof with one of two lateral screw fixing members provided on said pendent, so that when said sheet member is connected to said laser marker, said pendent and said two chains are hung under said sheet member in a shape of "Y".

5. The auxiliary focusing tool for a laser marker as in claim 2, wherein said pendent is provided with a fine-tuning means composed of a screw hole on a bottom end of said pendent and a bolt screw-locking in said screw hole, so that said bolt may be adjusted to get a more accurate focal distance before focusing for processing.

* * * * *